Oct. 6, 1931.          C. C. FUERST          1,826,243
SELF ERECTING FRONT FOCUSING CAMERA
Filed Nov. 21, 1929          2 Sheets-Sheet 1
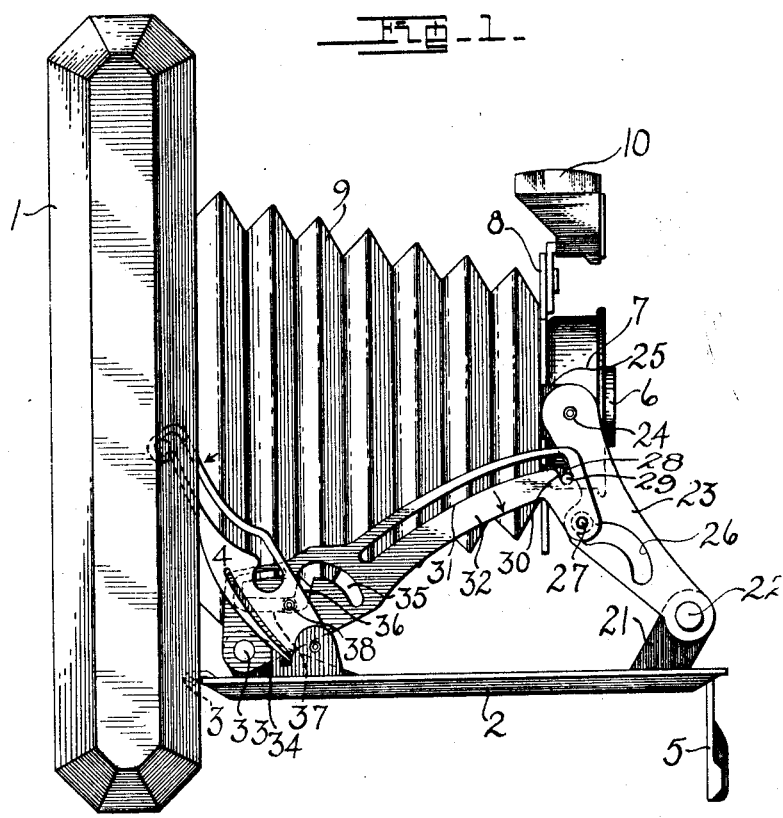
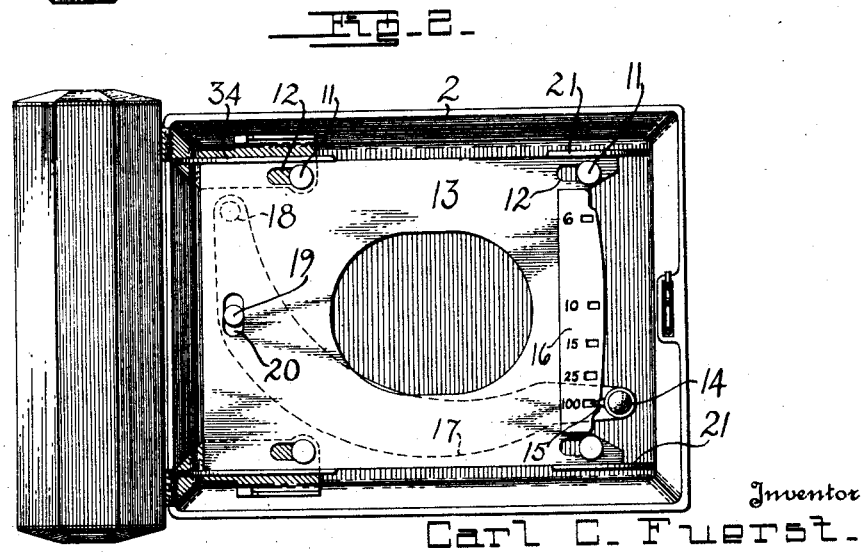
Inventor
Carl C. Fuerst.
By
Attorneys Oct. 6, 1931.  C. C. FUERST  1,826,243
SELF ERECTING FRONT FOCUSING CAMERA
Filed Nov. 21, 1929    2 Sheets-Sheet 2
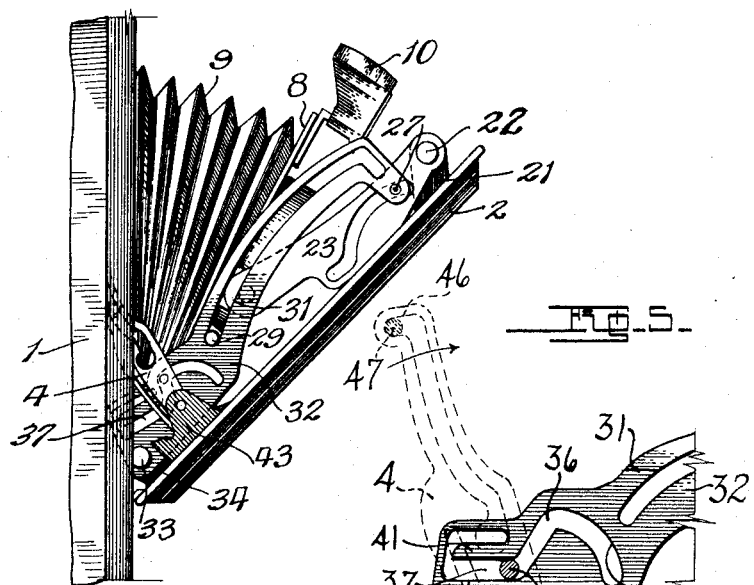
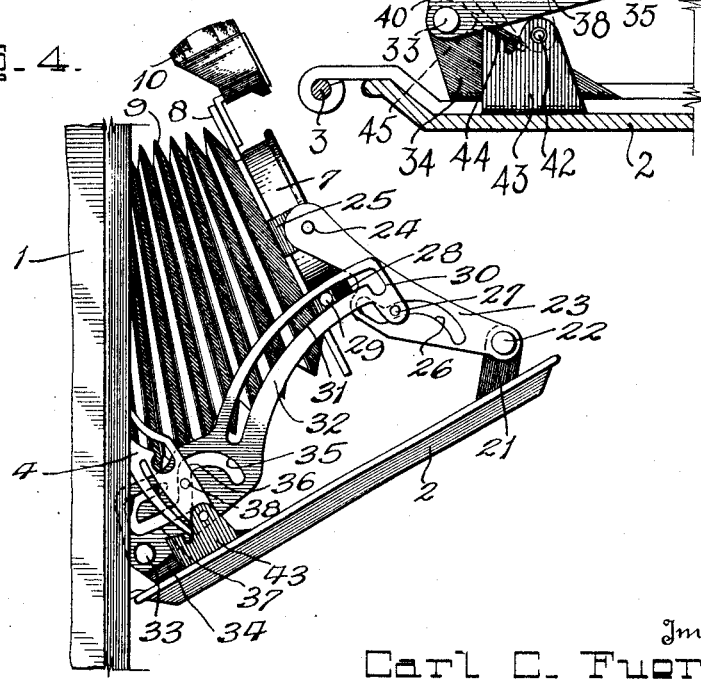
Inventor
Carl C. Fuerst.
By Newton M. Arrindo,
Donald H. Stewart,
Attorneys Patented Oct. 6, 1931

1,826,243

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

SELF ERECTING FRONT FOCUSING CAMERA

Application filed November 21, 1929. Serial No. 408,687.

This invention relates to photography and more particularly to compact folding cameras sometimes known as self-erecting front cameras. One object of my invention is to provide a camera of the type described in which the lens board carrying the objective is accurately guided throughout its range of movement. Another object of my invention is to provide a camera with a self-erecting front mechansim which permits focusing movement of the camera objective relative to the camera body. Another object of my invention is to provide a cam and cam follower in which the cam follower is held into intimate contact with the cam, and other objects will appear from the following specification, the novel features being particularly pointed out in the claims at the end thereof.

This camera is an improvement over the camera shown in Patent No. 1,602,582, Kroedel, October 12, 1926, and also has certain features in common with his two earlier patents, Nos. 1,380,810 granted June 7, 1921 and 1,435,646 granted November 14, 1922.

Coming now to the drawings wherein like reference characters denote like parts throughout:

Fig. 1 is a side elevation of a camera constructed in accordance with and illustrating a preferred embodiment of my invention.

Fig. 2 is a plan view of the camera shown in Fig. 1 with certain parts removed to show the focusing arrangement on the bed.

Fig. 3 is a fragmentary side elevation showing the self erecting front mechanism in one position.

Fig. 4 is a view similar to Fig. 3 but with the parts in a more fully extended position and Fig. 5 is an enlarged fragmentary detailed side elevation showing one of the cooperating cams and cam followers.

Referring to Fig. 1, a typical camera constructed in accordance with my invention may consist of a camera body 1 having a bed 2 which may be hinged to the camera body at 3, the body being adapted to be held in an open position by means of a bed brace 4. The leg 5 may be hinged to the bed to form a support for the camera when in an extended position.

An objective may be mounted in the usual cells 6, (only one of which is shown) which are attached to a shutter 7, the shutter being in turn mounted on a lens board 8. The lens board 8 is connected to the camera body 1 by means of a bellows 9.

The lens board carries a finder 10 and, as thus far described, the parts of the camera are all well known.

In accordance with my invention, the bed 2 is provided with a plurality of studs 11 which pass through slots 12 in a slide 13. This slide may be moved back and forth on the bed by means of a handle 14 bearing a pointer 15 adapted to indicate on a scale 16 a focal setting, the handle 14 being carried by a lever 17.

Lever 17 is pivoted at 18 to the camera bed and carries a stud 19 extending up through a slot 20 in the slide. By turning a lever upon its pivot 18, the slide is moved back and forth.

The slide 13 is provided with a pair of upstanding bearings 21 to which are pivoted at 22 a pair of links 23 pivoted at 24 to the ears 25 which are preferably struck out from the lens board 8.

The links 23 are provided with cam slots 26 which are curved throughout their major portion and which have a straight portion 27 at the end.

The lens board 8 has a second pair of ears 28 formed forwardly, these ears supporting pins 29. Pins 29 engage when the camera is in an open position the hook-like ends or straight portions 30 of the angularly disposed cams 31 which are cut in the braces 32 which are hinged at 33 to the bearings 34 which extend up from the slide 13.

The lens board 8 and the links 23 constitute the folding lens carriage, and the hinged braces 32 perform two purposes, first, when the pins 29 lie in the ends 30 of the cam 31, the lens board is held in an erect position as shown in Fig. 1. As shown in Figs. 3 and 4, when the camera is being opened or closed, the pins 27 and 29 and the slots 26 and 31 form the sole connections between the hinged brace and the pivoted lens carriage for holding the parts erect. The pins and the slots also guide the camera objective throughout its entire path of movement in both opening and closing the camera.

In order to actuate the hinged brace 32, there is a cam and cam follower connection between these braces and the bed brace 4 very similar to that shown in the Kroedel Patent 1,602,582 above referred to. The hinged braces 32 are each provided with an arcuate cam slot 35 having two straight portions 36 and 37 angularly arranged with respect to each other. A cam follower 38 lies in this cam slot and with respect to the arcuate portion 35 of the cam slot of the stud portion 36 of this slot, the movement is the same as that described in the above mentioned Kroedel patent.

In other words, when the bed braces 4 are pressed in the direction shown by the arrow (Fig. 1) the pin 38 presses down on the bottom of cam slot 37 and causes the brace 32 to move downwardly in the direction shown by the arrow to release pin 29 from the end 30 of cam slot 31. This movement likewise releases pin 27 from the end of cam 26 and the parts can then be folded.

When, however, the parts are erect, as shown in Fig. 1, the focusing lever 14 may be swung about its hinge 18 so that the pin 19 through engagement with the slide 20 will move the slide 13 with respect to the bed 2.

This movement can be accomplished since pin 38 will ride idly in the straight portion 37 of the cam in the hinged brace 32.

It should be especially noticed that during this movement it is necessary to have the parts held in erect position by the pins 29 and 27 which lie in the ends of cam slots 30 and 26. In order to do this, the structure shown in Fig. 5 is used.

As here shown, the lower edge 40 of the cam slot 37 is fixed but the upper edge 41 is formed by striking out a small tongue of metal, and, by shaping this, this spring tongue can be made to force down upon the pin 38 which lies in the cam slot and thus the cam follower may be made to press against the rigid side 40 of the cam slot to hold the arm 31 in a fixed position throughout its focusing range of movement.

The bed brace 4 may be of the usual type pivoted at 42 to the bracket 43 which is carried by the camera bed 2. Bracket 43 is provided with a lug 44 adapted to engage a spring 45 struck from the bed brace 4, the action of this spring serving to formally throw the bed brace in the direction shown by the arrow (Fig. 5) in which the hook shaped end 46 may engage the stud 47 which is mounted in the camera body. To close the camera the bed braces are pushed towards the camera body in a direction opposite to that shown by the arrow against the pressure of spring lug 45. This will produce the movement for closing the camera above referred to.

With a self-erecting front mechanism constructed as above described, it will be seen that the movement of the lens carriage is not only positioned by the hinged links 23 and the hinged braces 32, but the entire range of movement in opening and closing the camera is controlled by means of the cams 26 and 31 which are engaged by the cam followers 29 and 27.

In the Kroedel Patent 1,602,582 and in the other patents of the same inventor, after the lens carriage was released, the side braces did not take part in controlling the movement of the lens carriage as it moved to and from the camera body. The camera bellows in these cameras was an important factor in guiding the lens carriage to and from an erect position. My improvement over the old Kroedel patents is in part guiding the lens carriage throughout its range of movement.

Having thus described my invention, what I claim as new and desire to secure by Letters Patent is:

1. In a folding camera the combination with a camera body and a bed hinged thereto, of a bed brace for supporting the bed, a foldable lens carriage hingedly attached to the bed, a hinged brace for holding the carriage erect, and connections between said hinged brace and said bed brace including a cam slot and a cam follower, and means for holding the cam follower tightly against one side of the slot.

2. In a folding camera the combination with a camera body and a bed hinged thereto, of a bed brace for supporting the bed, a foldable lens carriage hingedly attached to the bed, a hinged brace for holding the carriage erect, and connections between said hinged brace and said bed brace including a cam having a straight portion and a cam follower permitting movement of the bed brace to be transmitted from the bed brace to the hinged brace, and the straight portion of the cam permitting the hinged brace to move independently of the bed brace.

3. In a folding camera the combination with a camera body and a bed hinged thereto, of a bed brace for supporting the bed, a foldable lens carriage hingedly attached to the bed, a hinged brace for holding the carriage erect, and connections between said hinged brace and said bed brace including connections between the foldable lens carriage and the hinged brace including a pair of pins and a pair of slots, the pins being guided by the slots to produce a fixed relative movement of the parts.

4. In a folding camera the combination with a camera body and a bed hinged thereto, a bed brace for supporting the bed, a slide movably mounted on the bed, a foldable lens carriage carried by the slide, a hinged brace for holding the carriage erect carried by the slide, a cam and a cam follower connection between the bed brace and hinged brace permitting the latter to be moved through the former for erecting the front, and permitting the hinged brace to move with the slide without moving the bed brace.

5. In a folding camera, the combination with a camera body and a bed hinged thereto, a bed brace for supporting the bed, a slide movably mounted on the bed, a foldable lens carriage carried by the slide, a hinged brace for holding the carriage erect carried by the slide, a cam and a cam follower connection between the bed brace and hinged brace including a cam portion parallel to the slide permitting movement of the hinged brace relative to the bed brace with the slide.

6. In a folding camera the combination with a camera body and a bed hinged thereto, a bed brace for supporting the bed, a slide movably mounted on the bed, a foldable lens carriage carried by the slide, a hinged brace for holding the carriage erect carried by the slide, a cam in the form of a slot including a straight portion parallel to the bed, and a cam follower adapted to pass through the cam slot, the straight portion of the cam permitting movement of the slide.

7. In a folding camera the combination with a camera body and a bed hinged thereto, of a bed brace for supporting the bed, a foldable lens carriage hingedly attached to the bed, a hinged brace for holding the carriage erect and connections between said hinged brace and said bed brace including a cam slot and a cam follower, the cam slot having a spring wall and a fixed wall, the former normally holding the cam follower against the fixed wall.

8. In a folding camera the combination with a camera body and a bed hinged thereto, of a bed brace for supporting the bed, a foldable lens carriage hingedly attached to the bed, a hinged brace for holding the carriage erect, and connections between said hinged brace and said bed brace including a cam slot in the hinged brace having a fixed and a movable wall, and a cam follower on the bed brace adapted to lie in the cam slot and to be pressed against the fixed wall by the movable wall.

9. In a folding camera the combination with a camera body and a bed hinged thereto, of a bed brace for supporting the bed, a slotted hingedly mounted lens carriage mounted on the bed, a slotted hinged brace for holding the carriage erect, connections between the lens carriage and the hinged bed brace including spaced pins adapted to lie in the slots of the hinged brace and lens carriage.

10. In a folding camera the combination with a camera body and a bed hinged thereto, of a bed brace for supporting the bed, a slotted hingedly mounted lens carriage mounted on the bed, a slotted hinged brace for holding the carriage erect, and pins mounted on the hinged lens carriage and the hinged bed brace slidably mounted in the slots being the sole connections between the hinged lens mount and hinged brace.

11. In a folding camera the combination with a camera body, of a hinged bed thereon, bed braces adapted to support the bed, a lens board, means for holding the lens board erect including a hinged brace and a hinged link connecting the lens board to the bed, cooperating pin and slot connections on the lens board, bed brace and hinged link controlling the path of movement of the lens board.

12. In a folding camera, the combination with a camera body, and a bed hinged thereto, of a bed brace for supporting the bed, a slotted foldable lens carriage hingedly attached to the bed, a slotted hinged brace adapted to hold the carriage erect, connections between the bed brace, hinged brace and the foldable lens mount including a pin adapted to travel in said slot in said hinged brace, and means for holding the pin against one side of the slot.

Signed at Rochester, New York, this 19th day of November, 1929.

CARL C. FUERST.